US011750628B2

(12) United States Patent
Deardorff et al.

(10) Patent No.: US 11,750,628 B2
(45) Date of Patent: Sep. 5, 2023

(54) PROFILING NETWORK ENTITIES AND BEHAVIOR

(71) Applicant: Rapid7, Inc., Boston, MA (US)

(72) Inventors: Paul Deardorff, Durham, NC (US); Jonathan Hart, Kernville, CA (US); Oriana Ott, Somerville, MA (US)

(73) Assignee: Rapid7, Inc., Boston, MA (US)

( * ) Notice: Subject to any disclaimer, the term of this patent is extended or adjusted under 35 U.S.C. 154(b) by 108 days.

(21) Appl. No.: 16/221,647

(22) Filed: Dec. 17, 2018

(65) Prior Publication Data

US 2020/0195670 A1 Jun. 18, 2020

(51) Int. Cl.
| | | |
|---|---|---|
| *H04L 29/06* | (2006.01) | |
| *H04L 9/40* | (2022.01) | |
| *G06F 16/28* | (2019.01) | |
| *H04L 41/147* | (2022.01) | |
| *H04L 41/142* | (2022.01) | |

(52) U.S. Cl.
CPC ........ *H04L 63/1425* (2013.01); *G06F 16/285* (2019.01); *G06F 16/288* (2019.01); *H04L 41/142* (2013.01); *H04L 41/147* (2013.01); *H04L 63/1416* (2013.01); *H04L 63/1441* (2013.01)

(58) Field of Classification Search
CPC ............. H04L 63/1425; H04L 63/1441; H04L 63/1416; H04L 41/147; H04L 41/142; G06F 16/288; G06F 16/285
See application file for complete search history.

(56) References Cited

U.S. PATENT DOCUMENTS

| | | | | |
|---|---|---|---|---|
| 10,116,680 | B1* | 10/2018 | Han | G06F 21/552 |
| 2009/0073895 | A1* | 3/2009 | Morgan | H04L 63/0227 |
| | | | | 370/255 |
| 2012/0071151 | A1* | 3/2012 | Abramson | H04W 12/082 |
| | | | | 455/418 |
| 2012/0221949 | A1* | 8/2012 | Olsa | G06F 11/3476 |
| | | | | 715/704 |
| 2015/0121518 | A1* | 4/2015 | Shmueli | H04L 63/1425 |
| | | | | 726/22 |
| 2015/0205957 | A1* | 7/2015 | Turgeman | G06F 21/554 |
| | | | | 726/23 |
| 2017/0214708 | A1* | 7/2017 | Gukal | H04L 63/1408 |
| 2018/0101676 | A1* | 4/2018 | Bailey | G06F 21/36 |
| 2019/0166141 | A1* | 5/2019 | Xu | G06N 3/047 |

FOREIGN PATENT DOCUMENTS

JP 2017120536 * 7/2017

* cited by examiner

*Primary Examiner* — Taghi T Arani
*Assistant Examiner* — Lin Chang
(74) *Attorney, Agent, or Firm* — Ashwin Anand

(57) ABSTRACT

Methods and systems for monitoring activity on a network. The system may first classify network activity data as being generated by a human actor or an automated process. Then, the system may assign a first behavioral profile to the entity based on the network activity data and detect anomalous activity associated with the entity.

2 Claims, 5 Drawing Sheets

PROFILING NETWORK ENTITIES AND BEHAVIOR

TECHNICAL FIELD

Embodiments described herein generally relate to systems and methods for monitoring activity on a network and, more particularly but not exclusively, to systems and methods for profiling network entities and their behavior.

BACKGROUND

Due to their prevalence in today's society, the internet and other types of networks have become hubs for criminal activity. Often times cyber-criminals or other threat actors attempt to install or otherwise deploy harmful applications on unprotected systems. Once a threat actor obtains access to a target system or device, they may perform further actions such as stealing data, escalating their privileges, or the like.

Additionally, there are few means to autonomously profile or classify an attacker based on their attack behavior. For example, most existing analysis techniques require an analyst or researcher to manually comb through data to find interesting characteristics in a log file or data corpus that may indicate malicious behavior.

A need exists, therefore, for systems and methods for monitoring network activity that overcome the shortcomings of existing techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for monitoring activity on a network. The method includes receiving network activity data at an interface; analyzing, using a processor executing instructions stored on a memory, the received network activity data with respect to one or more behavioral cues; classifying, using the processor, the network activity data as being generated by an entity selected from the group consisting of a human actor and an automated process based on the analysis of the network activity with respect to the one or more behavioral cues; assigning, using the processor, a first behavioral profile to the entity based on the entity classification and the network activity data; and detecting, using the processor, an anomalous activity associated with the entity based on the assigned first behavioral profile.

In some embodiments, the network activity data includes data from at least one of logs and event sources regarding commands executed by the entity.

In some embodiments, the method further includes assigning a second behavioral profile to the entity based upon at least one detected anomalous activity.

In some embodiments, the one or more behavioral cues include at least one of timing of keystrokes, timing of network events, typographical errors, and keystrokes. In some embodiments, the method further includes issuing an alert using a user interface upon detecting the anomalous activity. In some embodiments, the method further includes redirecting network activity data from the entity to a virtual security appliance for further communications.

In some embodiments, the behavioral profile includes at least one of intelligence gathering behavior, network maneuvering behavior, data exfiltration behavior, and vulnerability exploitation behavior.

In some embodiments, the entity is classified as an automated process, and the assigned behavioral profile corresponds to a particular toolkit identification.

According to another aspect, embodiments relate to a system for monitoring activity on a network. The system includes an interface for at least receiving network activity data and a processor executing instructions stored on a memory to classify the network activity data as being generated by an entity selected from the group consisting of a human actor and an automated process based on the analysis of the network activity data with respect to the one or more behavioral cues, assign a first behavioral profile to the entity based on the entity classification and the network activity data, and detect an anomalous activity associated with the entity based on the assigned first behavioral profile.

In some embodiments, the network activity data includes data from at least one of logs and event sources regarding commands executed by the entity.

In some embodiments, the processor is further configured to assign a second behavioral profile to the entity based upon at least one detected anomalous activity.

In some embodiments, the one or more behavioral cues include at least one of timing of keystrokes, timing of network events, typographical errors, and keystrokes. In some embodiments, the processor is further configured to issue an alert using a user interface upon detecting the anomalous activity. In some embodiments, the processor is further configured to redirect network activity data from the entity to a virtual security appliance for further communications.

In some embodiments, the behavioral profile includes at least one of intelligence gathering behavior, network maneuvering behavior, data exfiltration behavior, and vulnerability exploitation behavior.

In some embodiments, the entity is classified as an automated process, and the assigned behavioral profile corresponds to a particular toolkit identification.

According to yet another aspect, embodiments relate to a method for monitoring activity on a network. The method includes receiving network activity data at an interface; analyzing, using a processor executing instructions stored on a memory, the received network activity with respect to at least one of timing of keystrokes, timing of network events, typographical errors, and keystrokes; classifying the network activity data as being generated by a human actor based on the analysis of at least one of timing of keystrokes, timing of network events, typographical errors, and keystrokes; assigning a first behavioral profile to the human actor based on the network activity data; detecting an anomalous activity associated with the human actor based on the assigned first behavioral profile; and issuing an alert using a user interface upon detecting the anomalous activity.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Figure 1:
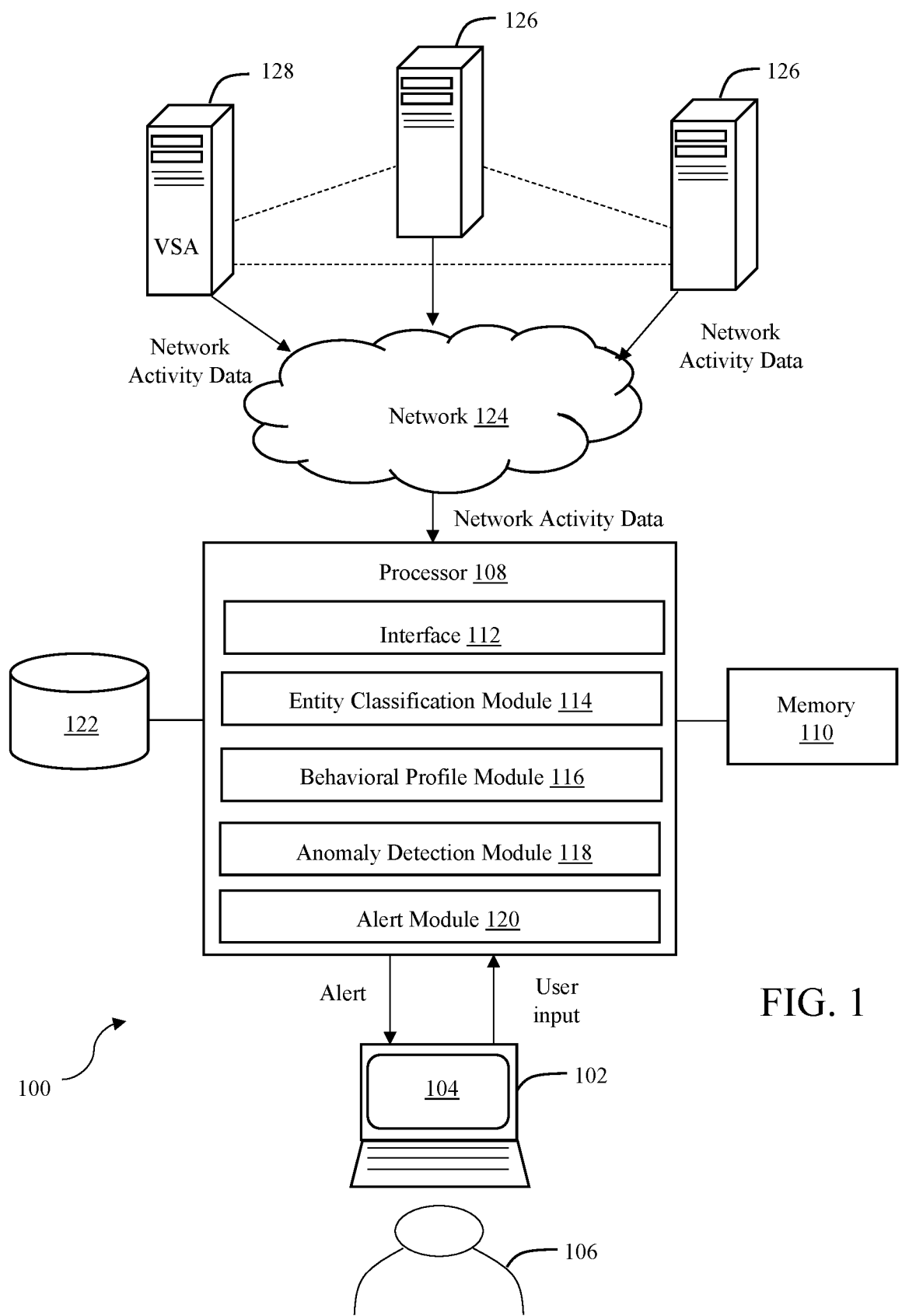
FIG. 1 illustrates a system for monitoring activity on a network in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The systems and methods described herein provide novel techniques for (1) classifying network activity as generated by a human actor or an automated process; and (2) categorizing behavior to anticipate certain activity and/or detect anomalous activity.

The systems and methods described herein may analyze previously collected inputs and monitor devices or systems such as virtual security appliances (e.g., honeypots). In order to understand attackers, the systems and methods described herein may rely on logs and event sources from honeypots to, for example, identify human actors, profile attackers, analyze behaviors, identify toolkits, and to anticipate risks by identifying different patterns of threats. For example, the systems and methods described herein may analyze logs or other event sources that include information about commands executed on a system, whether through SSH, TTY, terminal, or any number of local or remote access tools.

As mentioned above, the systems and methods described herein may first differentiate between activity generated by a human actor and activity generated by an automated process or script. By observing, tracking, and identifying patterns in actions across a variety of tool sets, the systems and methods described herein can catalogue commands and patterns observed on one or more networks. This data can be used to profile the intent of certain entities on one or more networks and predict possible future activity based on observed behavior and recognized intent.

Unlike existing network analysis techniques, the systems and methods described herein are completely autonomous. For example, the collection mechanism for gathering network activity data also automatically captures data from attacks against one or more monitored virtual security appliances. A wide distribution of virtual security appliances across multiple cloud environments increases the chances of receiving both scripted attacks and attacks carried out by a human actor.

FIG. 1 illustrates a system 100 for monitoring activity on a network in accordance with one embodiment. The system 100 may include a user device 102 executing a user interface 104 accessible by a user 106. The user interface 104 may allow a user 106 such as security personnel to view data regarding activity on a network and may also issue alerts to inform the user 106 of anomalous activity. The user 106 may then review any data associated with the alert (e.g., the data that caused the alert to be issued) and perform any appropriate action(s).

The user device 102 may be any hardware device capable of executing the user interface 104. The user device 102 may be configured as a laptop, PC, tablet, mobile device, or the like. The exact configuration of the user device 102 may vary as long as it can execute and present the user interface 104 to the user 106.

The user device 102 may be in operable communication with one or more processors 108. The processor(s) 108 may be any hardware device capable of executing instructions stored on memory 110 to accomplish the objectives of various embodiments described herein. The processor 108 may be a microprocessor, a field programmable gate array (FPGA), an application-specific integrated circuit (ASIC), or other similar device whether available now or invented hereafter.

In some embodiments, such as those relying on one or more ASICs, the functionality described as being provided in part via software may instead be configured into the design of the ASICs and, as such, the associated software may be omitted. The processor(s) 108 may be configured as part of the user device 102 on which the user interface 104 executes, such as a laptop, or may be located at some remote location.

The processor 108 may execute instructions stored on memory 110 to provide various modules to accomplish the features of various embodiments described herein. Specifically, the processor 108 may execute or otherwise include an interface 112, an entity classification module 114, a behavioral profile module 116, an anomaly detection module 118, and an alert module 120.

The memory 110 may be L1, L2, L3 cache or RAM memory configurations. The memory 110 may include non-volatile memory such as flash memory, EPROM, EEPROM, ROM, and PROM, or volatile memory such as static or dynamic RAM, as discussed above. The exact configuration/type of memory 110 may of course vary as long as instructions for monitoring network activity can be executed by the processor 108 to accomplish the features of various embodiments described herein.

The processor 108 may execute instructions stored on memory 110 and rely on data stored in the database(s) 122 to monitor activity on one or more networks 124 that include one or more network devices 126. The network(s) 124 may link the various devices with various types of network connections. The network(s) 124 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) 124 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The one or more databases 122 may store data regarding entities, entity classifications, behavioral profiles, behaviors associated with profiles, toolkits for generated automatic processes or scripts, or the like.

The network devices 126 may include any device that communicates on one or more networks 124. These may include, but are not limited to, computers, laptops, routers, firewalls, servers, phones, or otherwise any type of device that is initiating or receiving network traffic. In some embodiments, the system 100 receives data from a network device 128 that is configured as a virtual security appliance (VSA)/honeypot.

Security personnel may be interested in knowing whether activity on a network is generated by a human actor or an automated process. This is particularly true of malicious activity. In operation, the processor 108 may therefore consider network activity data from logs and/or event sources to first classify the entity associated with the network activity data as a human actor or an automated process.

Generally speaking, malicious network activity generated by a human actor is indicative of a more targeted and potentially more serious attack than activity generated by an automated process. For example, automated attacks are often generated from a kit and executed against multiple networks or entities at once with no specific intended target. In other words, these automated processes attack multiple targets and are not tailored to a specific entity or network. Parties responsible for these automated processes may initiate these automated processes against a wide net of targets with the hopes of receiving some compromising information related to one or more of the targets.

Attacks generated by human actors, on the other hand, are often more tailored to a particular network and/or device on a network. For example, a human actor may already be aware of vulnerabilities associated with a device and create certain attack patterns or techniques specifically tailored to exploit the known vulnerabilities.

Security personnel may therefore benefit by knowing which network activity (especially malicious activity) is generated by a human actor. If security personnel are aware of malicious activity generated by a human actor, they may be more inclined to proactively investigate the activity and/or address the activity to mitigate any potential damage.

The entity classification module 114 may analyze the network activity data received at the interface 112 to classify the network activity as being generated by a human actor or by an automated process. For example, the classification module 114 may consider various characteristics associated with the network activity data to make this classification.

In some embodiments, the analysis of the network activity data is a distributed process using, for example, Apache Spark, in which log files are sent to a number of nodes that process and split the received honeypot data into sessions. Accordingly, each node would receive a unique session to analyze, meaning that the incoming data is processed in parallel.

Figure 2:
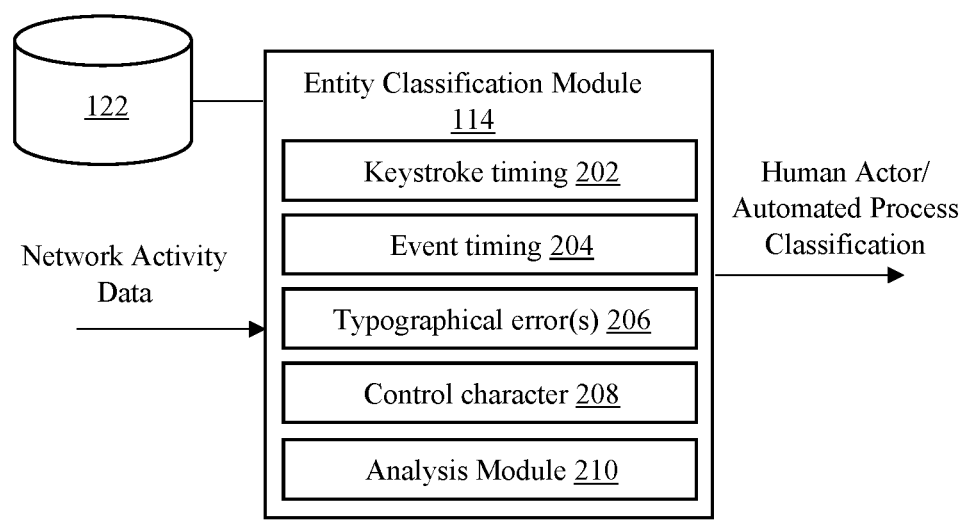
FIG. 2 illustrates the entity classification module of FIG. 1 in accordance with one embodiment.

FIG. 2 illustrates the entity classification module 114 of FIG. 1 in accordance with one embodiment. The entity classification module 114 may include one or more modules to analyze various behavioral cues associated with the received network activity data. For example, the entity classification module 114 of FIG. 2 may include a keystroke timing module 202, an event timing module 204, a typographical error(s) module 206, a control character module 208, and an analysis module 210. As seen in FIG. 2, the output of the entity classification module 114 is a classification of either a human actor or an automated process.

The keystroke timing module 202 may analyze the timing of keystrokes associated with the received network activity data. For example, average timing between keystrokes that is greater than some threshold may indicate or at least suggest that the data is generated by a human actor.

The event timing module 204 may analyze the times at which certain network events occur. These events may include commands executed on the network 124 such as through various protocols or services. These may include, but are not limited to, the secure shell (SSH) protocol, TeleTYpe (TTY) protocol, domain name system (DNS), reverse DNS, HyperText Transfer Protocol HTTP), transport layer security (TLS), secure sockets layer (SSL), User Datagram Protocol (UDP), Simple Mail Transfer Protocol (SMTP), Post Office Protocol (POP), Voice over Internet Protocol (VOIP), and File Transfer Protocol (FTP).

The timing of these events may be indicative of whether the entity generating the network activity data is a human actor or an automated process. For example, events commonly occurring in the early hours of the morning on a weekday may be indicative of an automated process. As another example, average gap times between events that exceed a threshold may indicate or at least suggest that a human actor is causing the events.

The typographical error(s) module 206 may detect any typographical errors in the commands included in the received network activity data. The typographical error(s) module 206 may also detect the use of certain keys, such as 'backspace' or other types of characters or keys that are not commonly used by automated processes or scripts. Accordingly, typographical errors and the use of various keys may be indicative that the analyzed activity is generated by a human actor.

The control character module 208 may detect any control characters in the executed commands, the presence of which may suggest that the activity data is generated by a human actor. Automated processes or scripts, on the other hand, generally do not rely on control characters.

The analysis module 210 may be configured to analyze the output from any one or more of the various modules 202-08 to determine whether the received network activity data was generated by a human actor. By considering multiple behavioral cues, the analysis module 210 can more accurately classify network activity data as being generated by a human actor or an automated process.

The analysis module 210 may analyze the output of one or more of the modules 202-08 in a variety of ways. For example, the analysis module 210 may output a classification that the network activity data is generated by a human actor only if two or more of the modules 202-08 provide a "vote" that its associated data indicates the network activity data is generated by a human actor.

The sensitivity of the analysis module 210 may be adjusted and may depend on the network, device(s) on the network, the company hosting the network, or the like. For example, some applications may be less sensitive to malicious activity and require all four modules 202-08 to output a human actor vote before the analysis module 210 classifies the entity generating the network activity data as a human actor. Other, more sensitive applications may require only one or more of the modules 202-08 to output a human actor vote before the analysis module 210 classifies the entity generating the network activity data as a human actor.

In some embodiments, a stronger showing of one or more behavioral cues may make up for a lesser showing of one or more other behavioral cues. For example, in a given instance the average timing between keystrokes may be only slightly above a timing threshold that would indicate or at least suggest a human actor is generating the activity data. However, there may be a significantly high number of typographical errors such that the analysis module 210 ultimately decides that the combination of the different behavioral cues suggests the activity is generated by a human actor.

The modules 202-08 and the data considered thereby is merely exemplary. The entity classification module 114 may consider other types of data in addition to or in lieu of the data described above as long as it can accomplish the features of the various embodiments described herein.

Referring back to FIG. 1, the behavioral profile module 116 may analyze the network activity data and assign a behavioral profile to the entity. The assigned behavioral profile may also depend on the entity classification.

The behavioral profile module 116 may catalogue commands and patterns of commands in sequence to identify patterns of behaviors. These types of patterns provide a wealth of intelligence and may be leveraged to recognize the intent of the entity, predict possible future activity based on patterns and intents, and/or identify certain tool/toolkits behind the activity (if generated by automated process).

For instance, the behavioral profile module 116 may assign a "reconnaissance" profile to the entity based on activity that suggests the entity is performing reconnaissance on the network(s) 124. This activity may include, but is not limited to, the entity scanning the network 124, performing port scans on devices 126 on the network 124, or performing other interrogation-related activities.

As another example, the behavioral profile module 116 may assign a "network pivoting" profile to the entity based on how the entity maneuvers through the network(s) 124. As yet another example, the behavioral profile module 116 may assign an "exploitation" behavioral profile to the entity based on activity that suggests the entity is exploiting a vulnerability on the network 124 or on a network device 126. As yet another example, the behavioral profile module 116 may assign a "data exfiltration" behavioral profile to the entity based on activity that suggests the entity has obtained access to a network device 126 and is exfiltrating data therefrom. This list of behavioral profiles is merely exemplary and other behavioral profiles may be assigned based on a variety of types of data to accomplish the features of various embodiments described herein.

In some embodiments, the behavioral profile module 116 may be tasked with creating or otherwise defining the profiles. This step may be part of a training stage in which the behavioral profile module 116 analyzes network activity data in a supervised and/or unsupervised manner to create profiles that represent entity behavior in a meaningful way.

For example, during a training phase the behavioral profile module 116 may group instances of similar network activity data together. A user such as security personnel may review the grouped activity data and assign it a label indicative of the type of behavior exhibited.

Data regarding the created profiles may be stored in the one or more databases 122. For example, this stored data may include behavior or behavioral patterns that are at least commonly exhibited by entities that are associated with a particular profile.

In some embodiments, however, the profiles may be previously defined (e.g., by a third party). Knowledge regarding the defined profiles and the behaviors associated with the defined profiles may be communicated to and stored in the one or more databases 122. The behavioral profile module 116 may then rely on this stored data to accomplish the features of the embodiments described herein.

By identifying patterns of attacks, the systems and methods described herein can anticipate future activity, potential risks, and attack behaviors. Through the modeling processes executed by the processor 108, the systems and methods described herein can issue alerts based on activity or behavior that deviates from what is expected. For example, knowing when a suspected attacker switches between different behavioral profiles may help the system 100 track suspicious users through the network 124 as well as identify anomalous activity. Similarly, the systems and methods described herein can predict future behavior based on pattern chains that commonly appear in attack scenarios.

The system 100 may therefore enable a variety of responses to suspicious users while reducing the impact to legitimate users. This enables the additional benefits of reducing false positives and the additional overhead that false positives create for security teams. For example, the system 100 may direct all communications coming from a suspected attacker to a virtual security appliance 128.

Figure 3A:
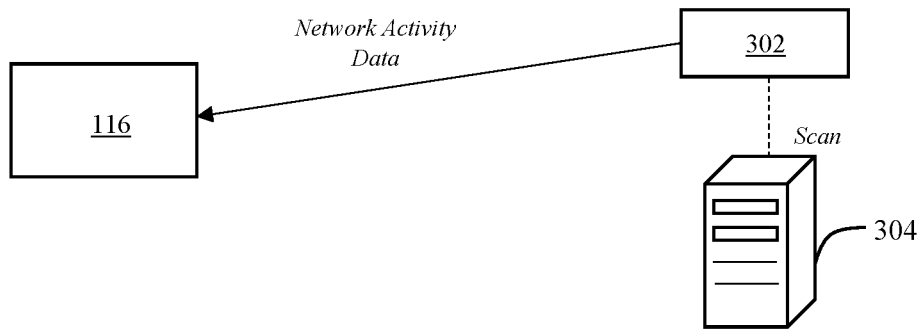
FIGS. 3A-D illustrate the behavioral profile module of FIG. 1 receiving network data from a network device and assigning behavioral profiles to the network device in accordance with one embodiment.

FIGS. 3A-D illustrate steps performed by the behavioral profile module 116 in accordance with one embodiment. In FIG. 3A, the behavioral profile module 116 may receive network activity data regarding a first network device 302. In this particular example, the first network device 302 may be scanning one or more other second devices 304 on a network. For example, the first network device 302 may be trying to determine which ports are open on the second device 304.

Figure 3B:
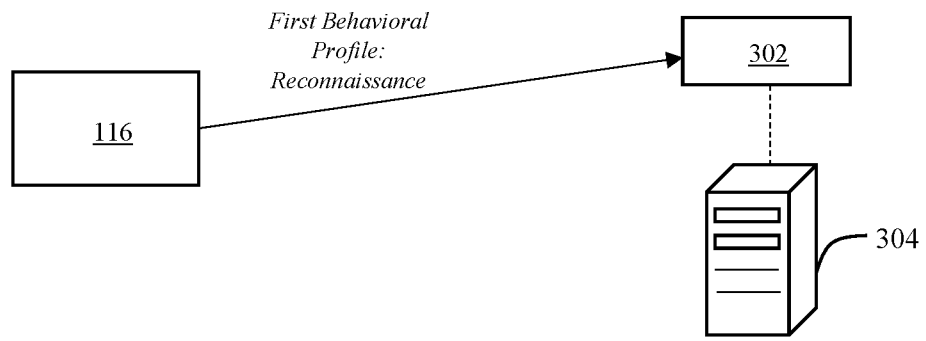

The behavioral profile module 116 may therefore assign a first behavioral profile to the first network device 302 based on the network activity data. As seen in FIG. 3B, the behavioral profile module 116 has assigned a "reconnaissance" profile to the first network device 302 based on the fact that the first network device 302 was scanning the one or more second devices 304.

Based on the assigned profile, the system 100 may have expectations about how the first network device 302 should behave. If/when the first network device 302 changes its behavior such that it deviates from what is expected, the behavioral profile module 116 may conclude that the first network device 302 is attempting some other action.

Figure 3C:
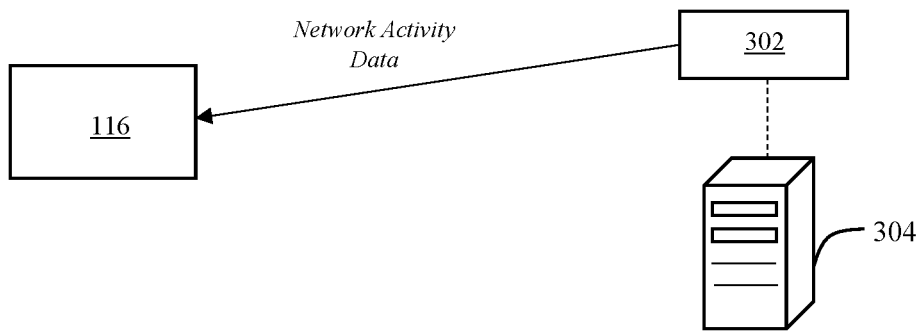
Figure 3D:
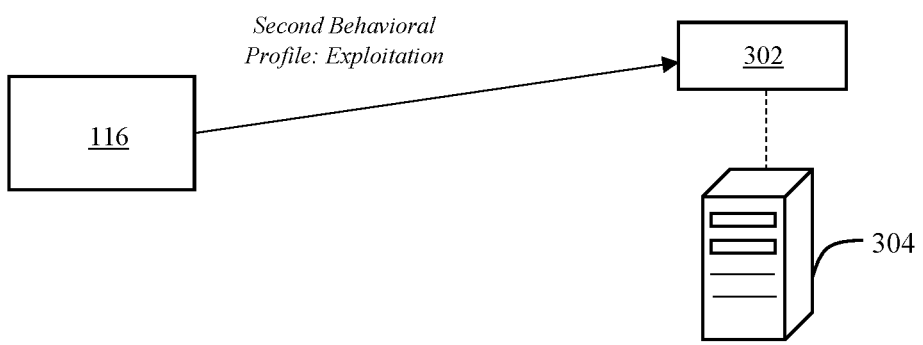

For example, FIG. 3C shows the behavioral profile module 116 continuing to receive network activity data. However, at this point the network device 302 may no longer be scanning the other device 304. In fact, the first network device 302 may be performing some action(s) aiming to exploit a discovered vulnerability on the second device 304. Accordingly, FIG. 3D shows the processor 108 assigning a second behavioral profile of "exploitation" to the first network device 302.

Referring back to FIG. 1, the anomaly detection module 118 may similarly note when a network device such as the device 302 of FIGS. 3A-D acts in a way that is anomalous or otherwise unexpected. This may be indicative of a threat actor switching to behavior that is more threatening to the network 124 or a device on the network 214.

Upon detecting an anomaly or otherwise a change in behavior, the alert module 120 may issue an alert to the user 106 informing the user 106 of the anomaly. The alert may be presented via the user interface 104, and may be a visual-based alert, an audio-based alert, a text-based alert, a haptic-based alert, or some combination thereof.

The user 106 may then take any appropriate action such as mitigating an existing threat. For example, the user 106 may monitor the behavior of the entity and address any potential malicious behavior. Additionally or alternatively, these mitigation steps may be performed autonomously.

Figure 4:
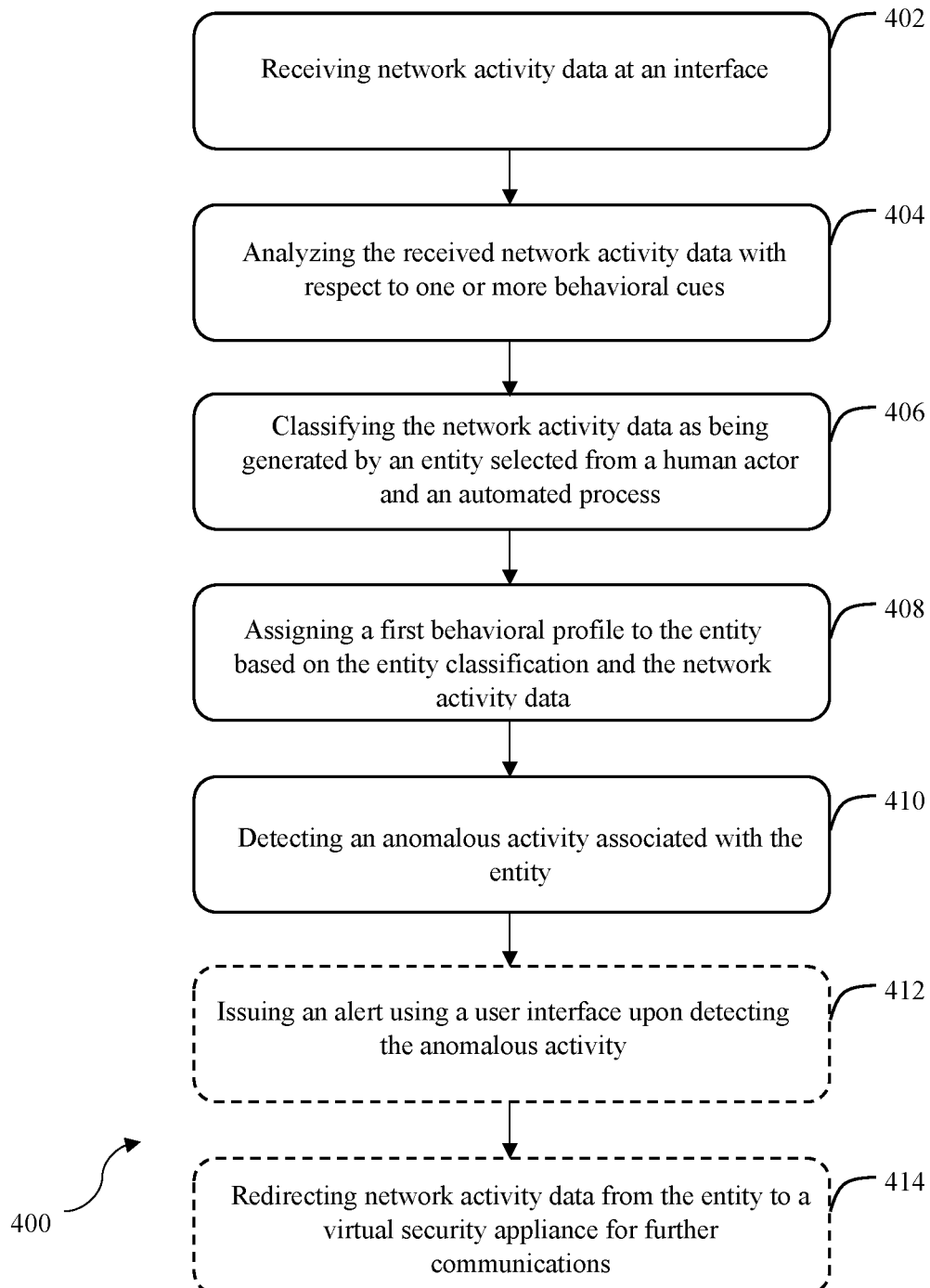
FIG. 4 depicts a flowchart of a method for monitoring activity on a network in accordance with one embodiment.

FIG. 4 depicts a flowchart of a method 400 for monitoring activity on a network in accordance with one embodiment. Step 402 involves receiving network activity data at an interface. The network activity data may include logs summarizing event sources. These event sources may include data regarding SSH connections, TTY events, terminal activity, shell input, etc.

Step 404 involves analyzing, using a processor executing instructions stored on a memory, the received network activity data with respect to one or more behavioral cues. The processor may be similar to the processor 108 of FIG. 1, for example.

The behavioral cues may relate to one or more of keystroke timing, event timing, typographical errors, and control characters. This list is merely exemplary, and other data in addition to or in lieu of this data may be analyzed by the processor in determining whether the network activity is generated by a human actor or an automated process.

Step 406 involves classifying, using the processor, the network activity data as being generated by an entity selected from the group consisting of a human actor and an automated process based on the analysis of the network activity with respect to the one or more behavioral cues. As discussed previously, certain data behavioral cues such as those listed above may indicate or at least suggest that the entity generating the activity data is a human actor. For example, human actors are somewhat likely to create typographical errors in their commands (and use backspace/deletion commands), whereas automated processes would not.

Knowing that a human actor is generating the network activity may be valuable information for security teams, particularly if the network activity is malicious or otherwise anomalous. As discussed above, this is because human actors are more likely to specifically target a particular network or device(s) on a network than automated processes, which are typically generated by toolkits and run against several devices or networks. Human-created attacks, on the other hand, may be specifically tailored to exploit known vulnerabilities.

Step 408 involves assigning, using the processor, a first behavioral profile to the entity based on the entity classification and the network activity data. The processor may consider, for example, certain commands included in the network activity data to determine a possible intent of the entity. Based on the behavior, the processor may assign a first behavioral profile to the entity.

For example, if an entity is performing port scans on devices on a network, the processor may assign a behavioral profile of "reconnaissance" to the entity. Based on the assigned behavioral profile, the entity may be expected to behave in certain ways. For example, an entity that is assigned the "reconnaissance" profile may be expected to perform scans and interrogate certain hosts.

Step 410 involves detecting, using the processor, an anomalous activity associated with the entity based on the assigned first behavioral profile. The processor may detect anomalies upon the entity exhibiting behavior that is unexpected based on its assigned behavioral profile. Accordingly, the processor may detect an anomaly upon the entity switching from behavior associated with the entity's assigned behavioral profile to behavior that is at least more closely related to a second behavioral profile.

Step 412 is optional and involves issuing an alert using a user interface upon detecting the anomalous activity. The user interface may be similar to the user interface 104 of FIG. 1, and may inform a user such as security personnel of the detected anomaly. As discussed above, the alert may be a visual-based alert, an audio-based alert, a text-based alert, a haptic-based alert, or some combination thereof.

The user may then investigate activity data associated with the entity to, for example, analyze the cause of the alarm. The system or user may also perform any mitigation steps to address threatening behavior. For example, step 414 is optional but involves redirecting network activity data from the entity to a virtual security appliance for further communications. Additionally, data from this method 400 may be used to continuously refine the processor's capabilities for identifying different behaviors and reducing the margin of error.

Figure 5:
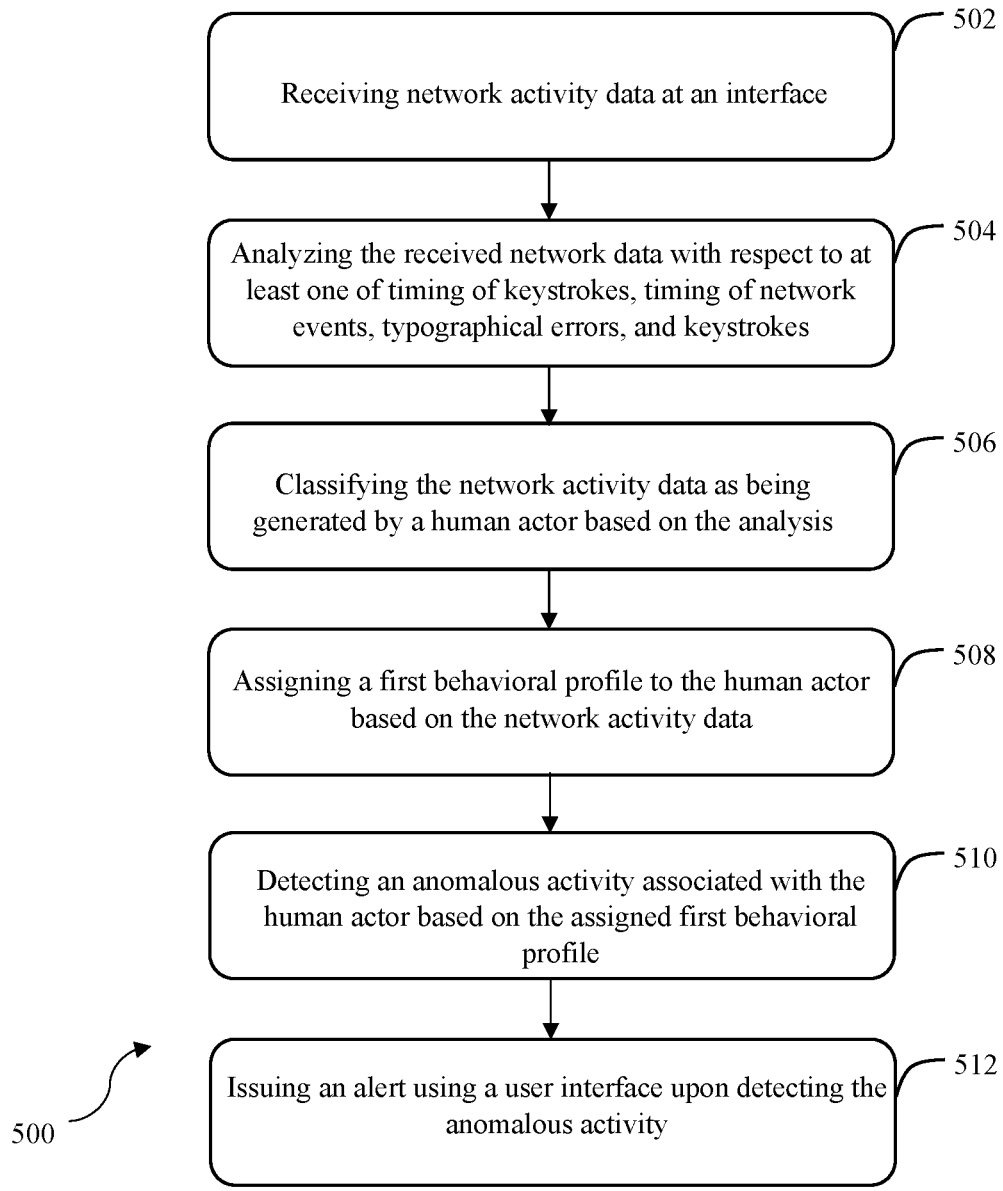
FIG. 5 depicts a flowchart of a method for monitoring activity on a network in accordance with another embodiment.

FIG. 5 depicts a flowchart of a method 500 for monitoring network activity in accordance with another embodiment. Step 502 involves receiving network activity data at an interface. The received network activity data may include logs summarizing event sources. These event sources may include data regarding SSH connections, TTY events, terminal activity, shell input, etc. As discussed previously, the network activity data may be received from a virtual security appliance such as a honeypot.

Step 504 involves analyzing, using a processor executing instructions stored on a memory, the received network activity with respect to at least one of timing of keystrokes, timing of network events, typographical errors, and keystrokes. As discussed previously, the presence of these behavioral cues may indicate or at least suggest that a human actor is generating the network activity data.

Step 506 involves classifying the network activity data as being generated by a human actor based on the analysis of at least one of timing of keystrokes, timing of network events, typographical errors, and keystrokes. This step may be performed by the entity classification module 114 of FIGS. 1 and 2, for example.

Step 508 involves assigning a first behavioral profile to the human actor based on the network activity data. This step may be performed by the behavioral profile module 116 of FIGS. 1 and 2, for example. The assigned behavioral profile may include, but is not limited to, any one of the exemplary behavioral profiles discussed above.

Step 510 involves detecting an anomalous activity associated with the human actor based on the assigned first behavioral profile. The processor in this embodiment may continuously receive network activity data regarding the human actor, even after assigning the first behavioral profile. However, based on the assigned behavioral profile, the entity may be expected to behave in certain ways. Accordingly, deviations from this expected behavior may be considered anomalous.

Step 512 involves issuing an alert using a user interface upon detecting the anomalous activity. The user interface may be similar to the user interface 104 of FIG. 1, and may inform a user such as security personnel of the detected anomaly. As discussed above, the alert may be a visual-based alert, an audio-based alert, a text-based alert, a haptic-based alert, or some combination thereof.

The user may then investigate the activity data associated with the entity to, for example, analyze the cause of the alarm. The user or system may also perform any mitigation steps to address threatening behavior such as those discussed above.

Additionally, the systems and methods described herein may leverage the results of the analyses described herein in training situations by integrating behavior patterns recognized by the system into a unified structure. This structure can be replayed and reused in a simulated environment to, for example, create an "AI player" in wargame exercises that acts and behaves like a real attacker.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for monitoring activity on a network, the method comprising:
   performing, by a processor executing instructions stored on a memory:
      receiving network activity data at an interface, wherein
         the network activity data indicates commands executed by one or more entities in the network, and
         the network activity data comprises one or more logs summarizing event sources comprising Secure Shell (SSH) connections, TeleTYpe (TTY) events, terminal activity, and shell input;
      classifying the network activity data as being generated by an entity selected from the group consisting of a human actor and an automated process based on an analysis of the network activity data with respect to a plurality of behavioral cues comprising an amount of typographical errors in the commands, average timing between keystrokes in the commands, timing of network events, and use of control characters in the commands, wherein
         the classifying comprises:
            comparing the average timing between keystrokes to a predetermined timing threshold, and
            comparing the amount of typographical errors to a predetermined typographical error threshold, and
         the analysis of the network activity data is a distributed process where the one or more logs are sent to a plurality of nodes that process and split the network activity data into sessions so that the network activity data is processed in parallel;
      assigning a behavioral profile to the entity based on the entity classification and the network activity data, wherein
         the behavioral profile is switchable between a reconnaissance profile, a network pivoting profile, an exploitation behavior profile, and a data exfiltration profile based on the plurality of behavioral cues provided by the entity;
      detecting, based on additional network activity data received from the interface, that an activity of the entity deviates from an expected behavior of the entity based on the behavioral profile; and
      in response to detecting that the activity of the entity deviates from the expected behavior of the entity, issuing an alert identifying the activity of the entity as an anomalous activity.

2. A system comprising:
a processor for executing instructions stored on a memory to:
   receive, via an interface, network activity data of the network, wherein
      the network activity data indicates commands executed by one or more entities in the network, and
      the network activity data comprises one or more logs summarizing event sources comprising Secure Shell (SSH) connections, TeleTYpe (TTY) events, terminal activity, and shell input;
   classify the network activity data as being generated by an entity selected from the group consisting of a human actor and an automated process based on an analysis of the network activity data with respect to a plurality of behavioral cues including an amount of typographical errors in the commands, average timing between keystrokes in the commands, timing of network events, and use of control characters in the commands, wherein
      to classify the network activity data, the processor is configured to:
         compare the average timing between keystrokes to a predetermined timing threshold, and
         compare the amount of typographical errors to a predetermined typographical error threshold, and
      the analysis of the network activity data is a distributed process where the one or more logs are sent to a plurality of nodes that process and split the network activity data into sessions so that the network activity data is processed in parallel;
   assign a behavioral profile to the entity based on the entity classification and the network activity data, wherein
      the behavioral profile is switchable between a reconnaissance profile, a network pivoting profile, an exploitation behavior profile, and a data exfiltration profile based on the plurality of behavioral cues provided by the entity;
   detect, based on additional network activity data received from the interface, that an activity of the entity deviates from an expected behavior of the entity based on the behavioral profile; and
   in response to the detection that the activity of the entity deviates from the expected behavior of the entity, issue an alert identifying the activity of the entity as an anomalous activity.

* * * * *